(12) United States Patent
Bazzana

(10) Patent No.: US 12,546,883 B2
(45) Date of Patent: Feb. 10, 2026

(54) METHOD OF MODELLING THE UNCERTAINTY OF SENSORS IN A CENTRAL-LEVEL TRACKING ARCHITECTURE

(71) Applicant: Continental Autonomous Mobility Germany GmbH, Ingolstadt (DE)

(72) Inventor: Piergiovanni Bazzana, Blaustein (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 335 days.

(21) Appl. No.: 18/552,172

(22) PCT Filed: Mar. 17, 2022

(86) PCT No.: PCT/EP2022/057075
§ 371 (c)(1),
(2) Date: Sep. 23, 2023

(87) PCT Pub. No.: WO2022/200188
PCT Pub. Date: Sep. 29, 2022

(65) Prior Publication Data
US 2024/0168154 A1    May 23, 2024

(30) Foreign Application Priority Data

Mar. 24, 2021   (EP) .................................... 21164726
Jul. 7, 2021    (EP) .................................... 21184188

(51) Int. Cl.
*G01S 13/86*   (2006.01)
*G01S 13/66*   (2006.01)

(52) U.S. Cl.
CPC ............ *G01S 13/867* (2013.01); *G01S 13/66* (2013.01)

(58) Field of Classification Search
None
See application file for complete search history.

(56) References Cited

U.S. PATENT DOCUMENTS 9,212,869  B1 *  12/2015  Boardman ............ G01S 13/726
2019/0361106 A1 *  11/2019  Stachnik ............... G01S 13/931
(Continued)

OTHER PUBLICATIONS

S. Savastano and R. Guida, "Uncertainty Quantification in Synthetic Aperture Radar Remote Sensing Data Processing," IGARSS 2018—2018 IEEE International Geoscience and Remote Sensing Symposium, Valencia, Spain, 2018, pp. 9193-9196, doi: 10.1109/IGARSS.2018.8518217. (Year: 2018).*

(Continued)

*Primary Examiner* — Bernarr E Gregory
(74) *Attorney, Agent, or Firm* — Fitch, Even, Tabin & Flannery LLP

(57) ABSTRACT

A method of modelling the uncertainty of sensors in a central-level tracking architecture system for fusing a plurality of the sensor detections in respect to at least one sensor object. The detections acquired from the sensors correspond to at least one dimension of the at least one sensor object. For each sensor it is set a predetermined association gate minimum threshold for each dimension by setting a predetermined amount of sensor detection error for each dimension based on which an increase of each sensor detection error is modeled as a function of distance. An association gate is computed by increasing according to the modeling each sensor detection error above the predetermined association gate minimum threshold. A covariance matrix is computed for each sensor associated to each detection. A plurality of covariance matrices corresponding to all sensors is stored and made available to the central-level tracking system for fusing the plurality of sensor detections.

8 Claims, 5 Drawing Sheets

(56) References Cited

U.S. PATENT DOCUMENTS

2020/0057090 A1* 2/2020 Stachnik ............... G01S 13/931
2021/0192689 A1* 6/2021 Bosse ................ G01C 21/3807

OTHER PUBLICATIONS

The International Search Report and the Written Opinion of the International Searching Authority mailed on Jul. 1, 2022 for the counterpart PCT Application No. PCT/EP2022/057075.
The European Search Report mailed on Dec. 23, 2021 for the counterpart European Patent Application No. 21184188.7.
Springer, "Multisensor Data Fusion", https://www.mit.bme.hu/system/files/oktatas/targyak/7357/MultiSensorDataFusionNotes_DurrantWhyte_2011.pdf, ISBN 978-3-319-32662-1.
Hugh Durrant-Whyte, "Multi Sensor data fusion by Durrant-Whyte 2001", Australian Centre for Field Robotics, Version 1.2, Jan. 22, 2001.

Sofie Nilsson et al., "Object Level Fusion of Extended Dynamic Objects", IEEE International Conference on Multisensor Fusion and Integration for Intelligent Systems (MFI), IEE, Sep. 19, 2016, pp. 251-258, XP033065771, DOI: 10.1109/MFI 2016.7849497.
Lee Chnag Joo et al, "Sensor fusion for vehicle tracking based on the estimated probability (D1)", IET Intelligent Transport Systems, The Institution of Engineering and Technology, Michael Faraday House, Six Hills Way, Stevenage, Herts, SG1 2AY,vol. 12 No. 10, Dec. 1, 2018 (Dec. 1, 2018), pp. 1386-1395, XP006070533; ISSN: 1751-956X, DOI: 10.1049/IET-ITS, 2018.5024.
European Examination Report dated Mar. 18, 2025 corresponding to European Patent Application No. 21184188.7.
Kyeong-Eun Kim et al. "Sensor Fusion for Vehicle Tracking with Camera and Radar Sensor", 2017 17th International Conference on Control, Automation and Systems (ICCAS 2017), Oct. 2017, pp. 1075-1077, DOI: 10.23919/ICCAS.2017.8204375.
Letter of Reasons for Refusal mailed Jun. 19, 2024 from corresponding Japanese patent application No. 2023-552196.

* cited by examiner

METHOD OF MODELLING THE UNCERTAINTY OF SENSORS IN A CENTRAL-LEVEL TRACKING ARCHITECTURE

CROSS-REFERENCE TO RELATED APPLICATIONS

The present application is a National Stage Application under 35 U.S.C. § 371 of International Patent Application No. PCT/EP2022/057075 filed on Mar. 17, 2022, and claims priority from European Patent Application Nos. 21164726.8 and 21184188.7 respectively filed on Mar. 24, 2021, and Jul. 7, 2021, in the European Patent Office, the contents of which are herein incorporated by reference in their entireties.

BACKGROUND

1. Field

Embodiments of the present application relate to fusing detections from different types of sensors in a multiple sensor tracking system, and more particularly to modelling the uncertainty of the sensors in a central-level tracking system architecture.

2. Description of Related Art

It is known from prior art that fusing detections from different types of sensors in a multiple sensor tracking system has the advantage of a broader coverage of the sensor objects and a more accurate estimation of the future position of the target objects.

The target objects can be single target objects or multiple target objects.

In a central-level tracking architecture, all detections acquired from the sensors are being sent to a central tracking system that maintains corresponding tracks to each detection.

The theoretical advantage of the central-level tracking architecture is making best use of all the information contained in the detections.

One known problem of multi-sensor estimation is the so-called data association problem, that basically refers to knowing which already existing fused object should be associated with which new measurement coming from a specific sensor from the multiple sensors.

As pointed out in the Hugh Durrant-Whyte paper "Multi Sensor Data Fusion" [1]: "the many measurements made need to be correctly associated with the underlying states that are being observed. This is the data association problem. The data association problem includes issues of validating data (ensuring it is not erroneous or arising from clutter for example), associating the correct measurements to the correct states, (particularly in multi-target tracking problems) and initializing new tracks or states as required. Whereas conventional tracking is really concerned with uncertainty in measurement location, data association is concerned with uncertainty in measurement origin."

One of the known methods of dealing with sensor uncertainty is based on the "data driven modeling" of the sensor error, i.e., doing a measurement campaign, extracting data from the sensors and using fitting methods to determine the uncertainty.

This approach has two disadvantages: on one hand it is general more expensive, because collecting data over the field of view of the sensors requires special drive and measure sessions and on the other hand it leads to a map of uncertainty that requires high memory to be stored which is a problem for the embedded systems as it slows their performance.

Other approach known in literature is using directly the information provided by the sensors. This approach can be applied only when the sensors provide the full statistical information related to data they deliver. This is normally not the case in real world when the sensor manufacturer does not provide this type of information, which is another disadvantage.

SUMMARY

Aspects and objects of embodiments of the present application relate to more accurately modeling the sensor uncertainty in a central-level tracking architecture system, that is to define faster and less expensive the association gate for different sensors in order to improve the tracking performance and to define better the association gate for different sensors. Accordingly, a better tool is provided for the description of the measurement errors from the sensors that serve to the fusion of the sensor detections.

According to an aspect of an embodiment, there is provided a computer-implemented method of modelling the uncertainty of sensors in a central-level tracking architecture system for fusing a plurality of sensor detections in respect to at least one sensor object, each of the at least one sensor object placed at a respective distance from each respective sensor, and the distance calculated on main axis of each respective sensor, the method including: S1.1. acquiring for each sensor the sensor detections of the at least one sensor object and storing them, each sensor detection corresponding to at least one dimension of the at least one sensor object, and each sensor detection including a respective sensor detection error, S1.2. setting for each sensor a predetermined association gate minimum threshold for each dimension by setting for each sensor a predetermined amount of sensor detection error for each dimension, S1.3. modeling for each sensor an increase of each sensor detection error using the predetermined amount of sensor detection error as a function of the distance, S1.4. computing for each sensor an association gate for each sensor detection corresponding to each dimension by increasing according to the modeling the respective sensor detection error above the predetermined association gate minimum threshold, S1.5 computing for each sensor a covariance matrix associated to each sensor detection by using scaling methods, S1.6 storing a plurality of covariance matrices corresponding to all sensors and making the plurality of covariance matrices available to the central-level tracking system for fusing the plurality of sensor detections of the current observation sequence to at least one fused object of an immediately previous observation sequence, each of the at least one fused object corresponding to each of the least one sensor object.

Each covariance matrix represents the shape of the uncertainty of the corresponding sensor corresponding to each dimension.

According to an aspect of an embodiment, there is provided a data processing hardware having at least one computer processing unit core and comprising at least one volatile memory RAM and at least one non-volatile memory ROM characterized in that it is configured to carry out the computer-implemented method of modelling the uncertainty of the sensors according to any preferred embodiment.

According to an aspect of an embodiment, there is provided a computer program comprising instructions which, when the program is executed by the data processing hardware, causes the data processing hardware to carry out the steps of the computer-implemented method according to any preferred embodiment.

Aspects and objects of embodiments of the present application may provide a faster and less expensive estimation of the uncertainty of the measurements provided by the sensors as compared with the state of art. The improved estimation of the uncertainty gives the decision maker more tools to improve the correction of the errors from the sensors and to better exploit the features of each sensor in the fusion.

The method of the application is robust allowing to easily fit into the embedded systems without requiring high memory or high processing power and without requiring the full statistical information from the sensor manufacturers.

The method of the application can be used in any technical field where the sensor objects are in move and at least one of the different types of sensors senses the motion of the sensor objects. For example, the method can be used in the automotive industry or in the earth moving industry or in the construction industry.

BRIEF DESCRIPTION OF THE DRAWINGS

FIG. 1 is represented in two dimensions: the position of at least one fused object FOk in a plane.

FIG. 2 is represented in two dimensions: the position of the at least one fused object FOk in the plane.

FIG. 4 is represented in two dimensions: the position of the at least one fused object FOk in the plane.

DETAILED DESCRIPTION

Figure 1:
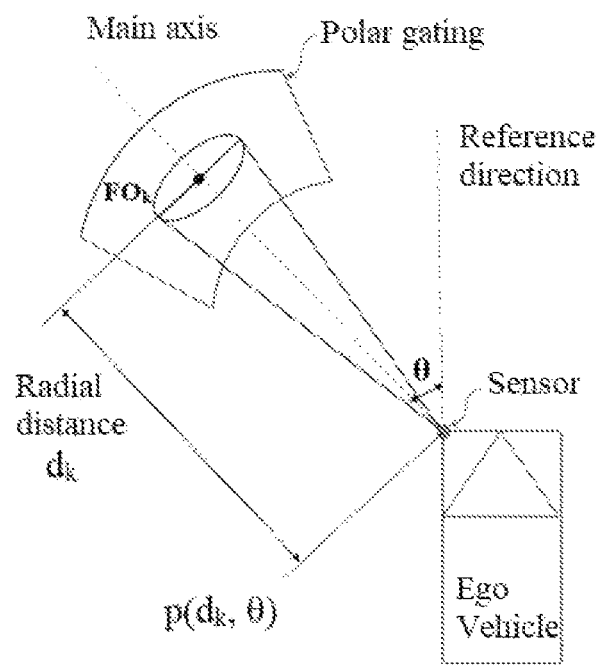
FIG. 1 is a diagram illustrating the principle of computing association gate using representation in polar coordinates. For the ease of understanding.

As described herein, measurement, alternatively called detection, or sensor detection refers to data corresponding to the value received in the current observation sequence from a sensor in a multiple sensor tracking system.

As described herein, a sensor object, alternatively called target object refers to object from real life sensed by one or more sensors.

As described herein, a fused object refers to sensor object whose fusion of the measurements took place in an immediately previous observation sequence.

As described herein, a target position for each sensor object refers to estimated position of the respective sensor object in the current observation sequence.

Embodiments of the present application may be implemented in a central-level tracking architecture system for fusing the sensor detections acquired from the sensors in respect to a single sensor object or to multiple sensor objects.

Embodiments of the present application may be applied to any land vehicle provided with sensors; the land vehicle being referred to as an ego vehicle. The ego vehicle is for example: a passenger car, a truck, a trailer roll, a bus, a crane, an earth moving equipment, a tractor, a motorcycle, a bicycle, etc.

The ego vehicle can be autonomous or manned.

For the sake of simplicity, throughout the detailed description and example of realization whenever it is mentioned a single sensor object $O_k$ placed at a distance $d_k$ from each respective sensor of the ego vehicle, the distance $d_k$ calculated on main axis of each respective sensor, each sensor detection corresponding to at least one dimension of the sensor object $O_k$, it shall be understood that the teaching disclosed for one single sensor object $O_k$ shall apply mutatis mutandis for all sensor objects object $O_k$.

The Embodiments of the present application may employ at least two sensors, as there is no fusing of sensor detections acquired from a single sensor.

For simplicity, throughout the specification, the term "sensors" refers to those sensors of the ego vehicle that were selected to provide of the sensor detections for the purpose of carrying out the method of the application in any embodiment. The ego vehicle may be provided with other sensors that are of no relevance for this application.

The sensor objects $O_k$ of the application are in move. The ego vehicle is typically in move, however it may temporarily stand still, such as when waiting at a traffic light.

Each sensor object $O_k$ has its own specific shape depending on the technology, position of the object and sensor mounting position.

The sensors track the motion of each sensor object $O_k$ and measure the at least one dimension for each sensor object $O_k$ that is placed within the field of view FOV of each respective sensor. The method of the application applies to those sensor objects $O_k$ that are simultaneously placed in the field of view FOV of two or more sensors.

The measurements are carried out by the sensors according to the specifications of each sensors' respective manufacturer.

Irrespective of the application of the method, the measurements of the sensors are sent to one or various fusion units in a central-level tracking system architecture for sensor fusion.

The measurements of the sensors are acquired by a data processing hardware which carries out all the steps of the application. The measurements of the sensors acquired are alternatively called "detections" or "sensor detections", meaning the data of the values acquired from the respective sensors, said data being then processed by the data processing hardware as disclosed in the steps of the method.

The method according to an embodiment comprises six steps. All steps are carried out by the data processing hardware in a current observation sequence.

It shall be understood that in an immediately previous observation sequence it was computed at least one fused object $FO_k$ corresponding to a particular sensor object $O_k$.

In the first step, the sensor detections from each sensor in respect to each sensor object $O_k$ are acquired in the current observation sequence and stored, each of the sensor detection corresponding to the at least one dimension of the at least one sensor object $O_k$. Each sensor detection includes a respective sensor detection error.

In the second step, for each sensor it is set a predetermined association gate minimum threshold for each dimension by setting for each sensor a predetermined amount of sensor detection error for each dimension as a function of the distance $d_k$.

In the third step, for each sensor it is modeled an increase of each sensor detection error using the predetermined amount of sensor detection error as a function of the distance $d_k$.

The modelling of the uncertainty is carried out independently for each sensor and each sensor object $O_k$, which means that the parameters of the modelling can be:
- in respect to the sensors: either the same parameters for all sensors, or different parameters for part or for all sensors,
- in respect to the sensor objects $O_k$: either the same parameters for all sensor objects $O_k$, or different parameters for part or for all sensor objects $O_k$.

Modeling of the uncertainty is done by using the information provided by the sensor manufacturer, deducting from it the standard deviations to be used in sensor error description.

Then, in the fourth step, for each sensor an association gate is computed for each sensor detection corresponding to each dimension by increasing according to the modeling the respective sensor detection error above the predetermined association gate minimum threshold.

The upper limit of the increase is defined by the limits of measurement of each sensor as mentioned in the corresponding technical specification.

The association gate, alternatively called validation gate, is an observation area around each sensor detection of the current observation sequence and the at least one fused object $FO_k$ of the immediately previous observation sequence. Each sensor detection represents the target position of the corresponding sensor object $O_k$.

The size of the gate is set based on the evaluation of the probability of false association versus probability of missing association using a criterion available in literature, namely the usage of $\chi^2$ distribution. The size of the gate, although indirectly and through the rest of the fusion algorithmics, is highly influenced by the size and shape of the sensor error modeled in steps two and three.

As well known in the literature the model of the sensor uncertainty is fundamental to allow the best usage of measurements.

As an extreme example, consider the case of fusing detections from two sensors, one being very precise in measuring positions in X direction and very poor in measuring positions in Y direction, and a second having the opposite property, i.e. very precise in Y direction and very poor in X direction. Assuming that the fusion method used is the Kalman filter (see for ex. https://en.wikipedia.org/wiki/Kalman_filter), and based on the related equations that are here assumed to be known, the resulting estimated position will mostly use the X position of the first sensor and the Y position of the second. In order to get this result from the fusion algorithm, and not restricted to the Kalman filter case, it is fundamental to provide the correct description of the measurements errors to the fusion algorithm. Moreover, the same description influences the association gate definition due to the fact that higher precision values from the sensor imply more strict association criteria and lower precision imply weaker association criteria. This is reflected in the above fifth step when the $\chi^2$ distribution is used.

In the fifth step, a covariance matrix is computed for each sensor associated to each of the sensor detection by using scaling methods.

The covariance matrix is the computable function of each dimension depending on the distance $d_k$ in the field of view FOV of the sensor, and by scaling, of the respective association gate. The scaling can be carried out by various formulas, a non-limiting example being by linear interpolation over distance and angles.

The covariance matrix represents the shape of the uncertainty of the corresponding sensor corresponding to each dimension.

In the sixth step, a plurality of covariance matrices is stored corresponding to all the sensors and made available to the central-level tracking system for fusing the plurality of sensor detections of the current observation sequence to at least one fused object $FO_k$ of the immediately previous observation sequence, each of the at least one fused object $FO_k$ corresponding to each of the least one sensor object $O_k$.

An overlap of the association gate or, respectively association gates of the fused object in the immediately previous observation sequence and each sensor detection of the current observation sequence is seen as an indication that the respective sensor detection may be validated in order to be fused to one or more fused objects $FO_k$. The rules for validation and fusing the sensor detections are outside the scope of this application, as the application only provides a better tool for determining the uncertainty of the sensor detections.

The method according to an embodiment as disclosed has the advantage that it is a simple although quantitative, faster and less expensive method for estimation of the uncertainty of the measurements provided by the sensors as compared with the state of art, because the covariance matrices outputted by the method, as mathematical expression of the uncertainty, rely on theory and on the data available in sensor documents from the sensors' manufacturers thus the time to perform calculations is shorter than in the prior art and, on the other hand do not require long, complex and expensive measurement campaign of the sensors accuracy, they and the method is less expensive than the methods of prior art.

The improved description of the uncertainty gives a decision maker more tools to improve the sensor's detection usage and to exploit faster and cheaper the features of each sensor in the fusion.

The method according to an embodiment is robust allowing to easily fit into the embedded systems without requiring high memory or high processing power-because computing covariance matrices does not require high memory or high processing power. Moreover, by using the method according to an embodiment, the full statistical information from the sensor manufacturers is no longer needed, because the reduced set of information provided in the sensors data sheet is normally adequate to compute the covariance matrices sufficient to give a description good enough for the purpose of sensor fusion, which makes the application particularly advantageous for those sensors for which the sensor manufacturers do not provide full information regarding errors.

In a preferred embodiment the method further comprises a sub-step of the fifth step:

In the fifth step, each covariance matrix is represented graphically by a matching ellipsoid, proportionally to the size of the respective covariance matrix and proportionally to the size of the association gate corresponding to each dimension, Each matching ellipsoid represents the shape of the uncertainty of the corresponding sensor corresponding to each dimension, the bigger size of the ellipsoid corresponding to a bigger degree of uncertainty of the respective sensor's detections.

Figure 4:
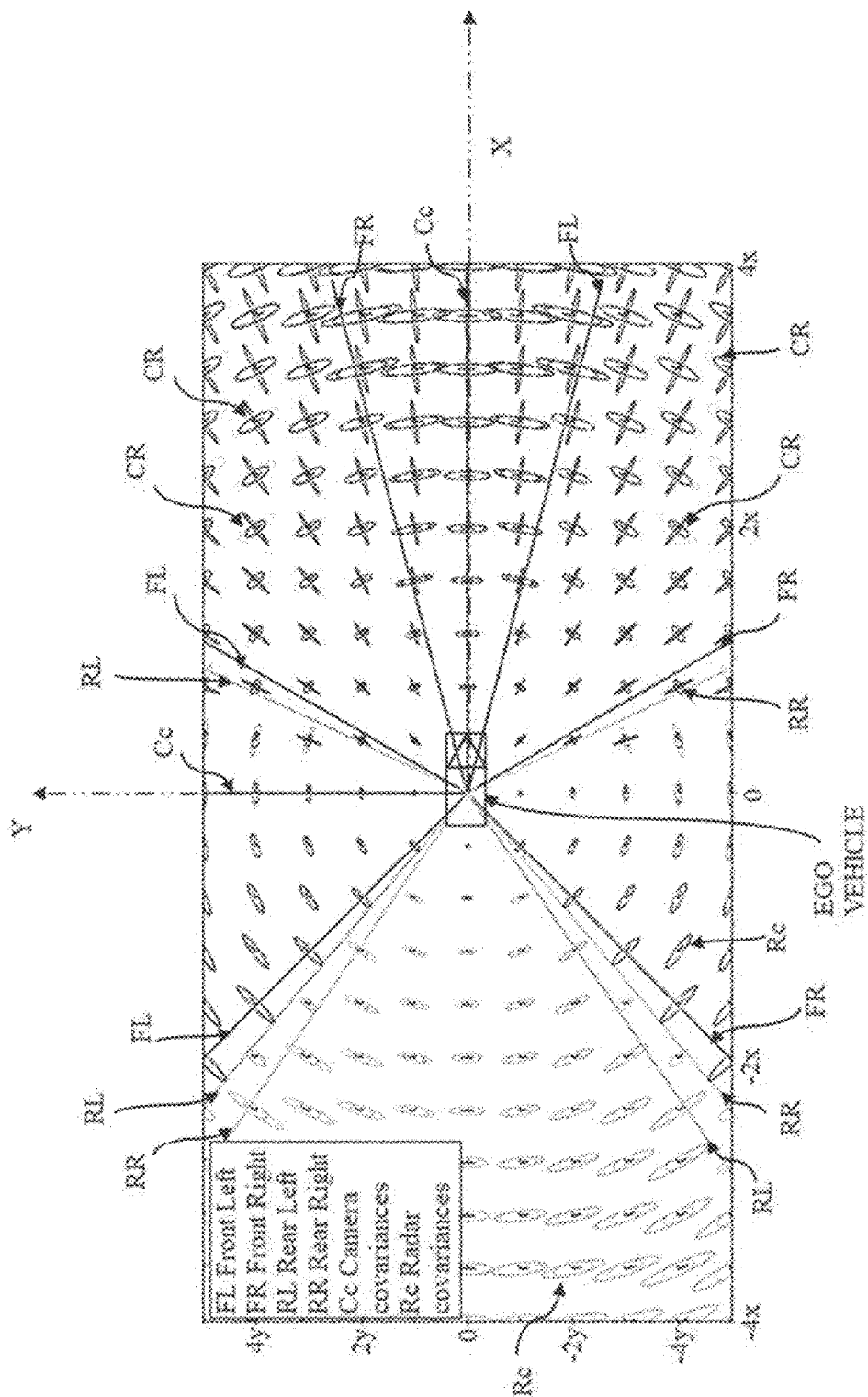
FIG. 4 is a diagram illustrating matching ellipsoids of the covariance matrices for the cameras and radars. For the ease of understanding.

By representing graphically the plurality of covariance matrices as matching ellipsoids, the embodiment has a further advantage to enable the decision maker to have a graphical overall image of which sensors and/or which areas in the field of view FOV of the sensors need action by the decision maker in order to reduce the uncertainty. The example of realization and FIG. 4 shows schematically such an overall image.

The method according to an embodiment with or without the graphical representation of the plurality of covariance matrices can be applied for a variable number of dimensions, among which three preferred embodiments are presented below:

In one preferred embodiment, there is only one dimension namely the position of the sensor object $O_k$. For the sake of simplicity of graphical representation, all the Figures depict the application of the method for the position of the sensor object $O_k$.

In another preferred embodiment, not represented graphically, there are two dimensions, namely the position and the relative velocity of the sensor object $O_k$ in respect to the ego vehicle, referred to for simplicity as the velocity of the sensor object $O_k$.

In another preferred embodiment, not represented graphically, there are three dimensions, namely the position, the velocity and the acceleration of the sensor object $O_k$.

The selection of type and number of dimensions takes into consideration the specific need to estimate the corresponding variable. For example, in case the ego vehicle is an earth moving equipment, knowing that this type of equipment moves very slowly as compared with a passenger car, it is not necessary to use the acceleration of the sensor object $O_k$, and, in some situations, it is not be necessary to use the velocity either.

On the contrary, if the ego vehicle is a road vehicle, particularly if there is a need to reduce the uncertainty of the sensors when the ego vehicle is moving above a certain speed, such as for example more than 60 km/h, it is convenient to select the position, the velocity and the acceleration of the sensor object $O_k$ to be used in the method.

In a preferred embodiment, the sensors are of the same type: i.e., radar sensors; cameras; ultrasonic sensors; lidar sensors, etc.

In another preferred embodiment, the sensors are of two or more types: i.e., radar sensors and cameras; radar sensors and ultrasonic sensors; radar sensors and lidar sensors; cameras, radar sensors and ultrasonic sensors, etc.

The number and combination of the sensors' type is defined by the existing configuration of sensors on the ego vehicle and the selection of the sensors made by the decision maker.

In one example, not represented graphically, some ego vehicles are provided with a single type of sensors, such as cameras. In this case, part or all the cameras are used for the applying of the method of an embodiment.

In other example, not represented graphically, other ego vehicles are provided with three types of sensors: cameras, radar sensors and ultrasonic sensors.

In all the examples, the method can be applied for all the sensors of the vehicle or only for part of the sensors.

Using the method according to an embodiment only for part of the sensors of the ego vehicle is useful when the decision maker knows that for example there is a need to reduce the uncertainty of the sensors that sense objects from a certain area in respect to the ego vehicle, such as for example the blind spot.

In another preferred embodiment, the sensor detections are acquired from at least one camera and from at least one radar. This embodiment will be illustrated in the example of realization and represented graphically in FIGS. 3A, 3B and 4.

By allowing multiple combinations between the number and the type of sensors and the number and type of dimensions measured by each sensor the application has the advantage to adapt to each particular need to reduce the uncertainty of the sensors of the ego vehicle and to the existing configuration of the sensors of the ego vehicle.

The method according to an embodiment is independent from the reference system, that is polar or cartesian.

All the computations made in either step of the method according to any of the preferred embodiments can be carried out either in polar coordinates or in cartesian coordinates.

If needed, the outcome of either step of the method as well as the outcome of the method itself can be converted from polar coordinates to cartesian coordinates and vice-versa.

The choice between using the polar or the cartesian representation is a convenience choice depending on which reference system simplifies more the computation and which reference system is used in the fusion.

Example: assume the tracking system is designed to use cartesian reference system, whereas the uncertainty of measurements of radars are more easily described in polar coordinates, as global uncertainty is naturally split into radial and angular uncertainty. For this example, the main reference system is a cartesian reference system and the uncertainty of the measurements of radars is converted from polar to cartesian.

FIG. 1 schematically depicts the principles of computing of the association gate in polar coordinates for the embodiment when there is only one dimension, namely the position. It can be seen from FIG. 1 that the radial distance is the distance $d_k$, and the azimuth is the angle $\theta$ between the main axis of the sensor and a reference direction of the respective sensor. Thus, the position p exemplified in FIG. 1 is written as p ($d_k$, $\theta$).

Figure 2:
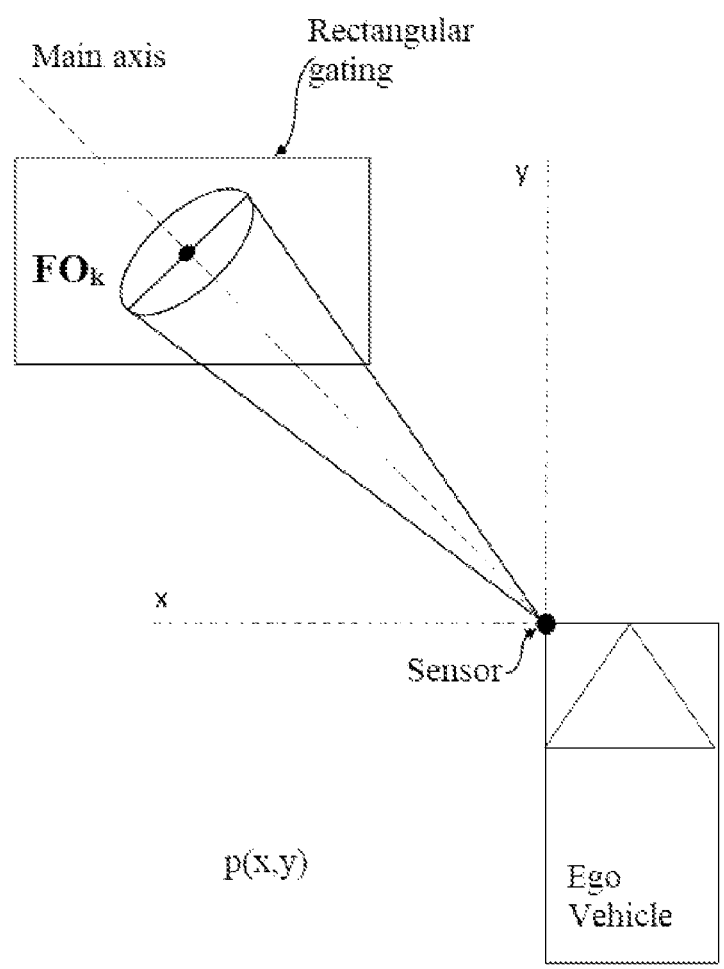
FIG. 2 is a diagram illustrating the principle of computing association gate using representation in cartesian coordinates. For the ease of understanding.

FIG. 2 schematically shows the same computing of the association gate in cartesian coordinates x,y for the same embodiment, where, for simplicity, the reference direction is the y axis. It can be seen from FIG. 2 that the position p is written as p (x,y).

In a second aspect of an embodiment, it is provided a data processing hardware having at least one computer processing unit core and comprising at least one volatile memory RAM and at least one non-volatile memory ROM characterized in that it is configured to carry out the computer-implemented method of modelling the uncertainty of the sensors according to any preferred embodiment.

The data processing hardware is, in a preferred embodiment, a separated processing unit from the sensor processing units, communicating with the sensor processing units by communication protocols.

In another preferred embodiment, the data processing hardware is included in one or more sensor processing units, carrying out apart from the method of the application, the usual tasks of the sensor processor unit.

In a third aspect of an embodiment, it is provided a computer program comprising instructions which, when the program is executed by the data processing hardware, causes the data processing hardware to carry out the steps of the computer-implemented method according to according to any preferred embodiment.

Figure 3A:
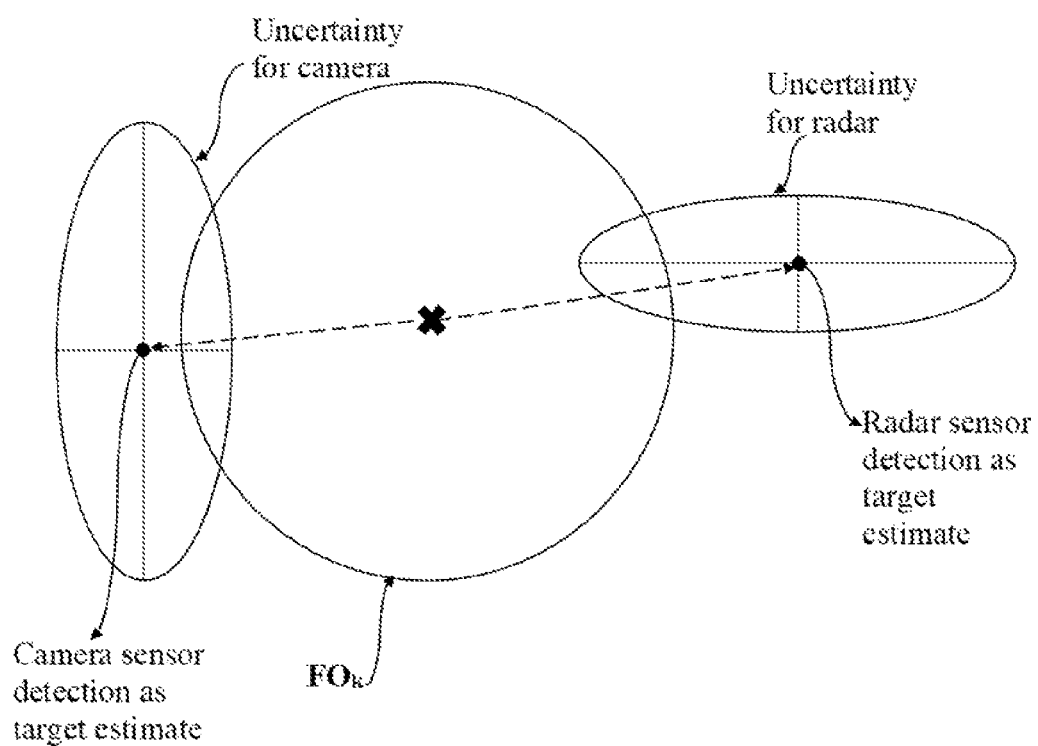
FIGS. 3A and 3B are diagrams illustrating the principles of the creation of the association gates for one radar and one camera of the vehicle, using representation in cartesian coordinates.
Figure 3B:
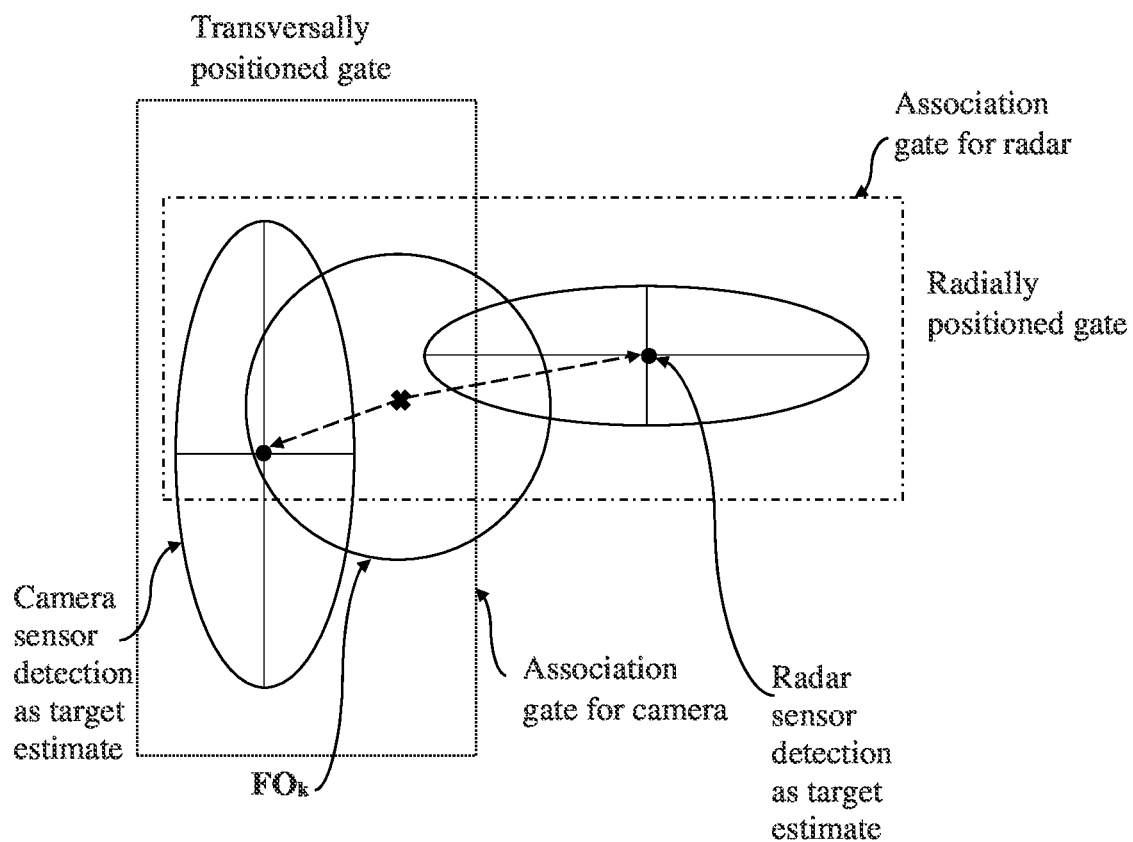

With reference to FIGS. 3A, 3B and 4, in the example of realization it is presented schematically the preferred embodiment using sensors of two type: radars and cameras.

For the ease of understanding, a single fused object $FO_k$ is depicted corresponding to a single sensor object $O_k$, and only the position p(x,y) of the sensor object $O_k$ is represented.

FIGS. 3A and 3B illustrate the principles of the creation of the association gates for one radar and one camera of the ego vehicle.

In FIG. 3A it is represented schematically the situation after having acquired the sensor detections from the radar and from the camera. Each ellipse describes a region where the fused object $FO_k$ could actually be the sensor object $O_k$ with a confidence of about 68%, given the received measurement.

The fused object $FO_k$ of the immediately previous observation sequence is also schematically represented. The question is whether the two sensor detections of the current observation sequence are to be fused or not to the fused object $FO_k$.

In FIG. 3B it is represented schematically the result of increase of the association gates for both sensors, the association gates represented as two rectangles. FIG. 3B also illustrates the representation of the matching ellipsoids for the two covariance matrices: one covariance matrix for the radar and the other one for the camera.

Typically, the increase of the radially positioned association gate—in this case the association gate for the radar, is more significant in length than in width. And likewise, typically, the increase of the transversally positioned association gate—in this case the association gate of the camera, is more significant in width than in length.

An overlap of the association gates with the fused object $FO_k$ is seen as an indication that the sensor detections of the current observation sequence are to be validated and fused to the fused object $FO_k$.

The overlap is evaluated using the formulas for computing distance measure between distributions, such as Mahalanobis distance or Kullback-Leibler divergence.

Based on the principles illustrated in FIGS. 3A and 3B, in FIG. 4 it is depicted an example where the ego vehicle is a passenger car or a bus having four side radars mounted in the front right angle, front left angle, rear right angle, and rear left angle, where left and right are considered in respect to the direction of movement towards the positive side of the axis x, and three cameras one facing forward and two laterals: lateral left and lateral right.

The limits of the fields of view FOV of the radar sensors are also indicated in FIG. 4 with FR, FL, RR, RL, whereas the limits of the FOV of the cameras is indicated in FIG. 4 with C.

FIG. 4 illustrates the matching ellipsoids of two types of covariance matrices:
- covariance matrices CR for the camera and the front left, respectively front right radar, the two ellipsoids being perpendicular to one another,
- for all the other parts of the fields of view FOV the ego vehicle radar covariances Rc for two radars or camera covariances Cc for two cameras, the two ellipsoids being one inside the other.

It can be seen from FIG. 4 how the uncertainty of the of the sensors in general increases when the distance and the angle increase. The exact manner how this happens is related to the characteristics of the specific sensor, which are described by the sensor documentation, and reflected in the coefficients of the covariance matrices.

While the description of the method and the system was disclosed in detail in connection to preferred embodiments, those skilled in the art will appreciate that various modifications and alterations of the present application will be apparent to those skilled in the art without departing from the essential scope to the teaching of the application and without diminishing its advantages. It is therefore intended that such modifications and alterations be covered by the appended claims.

The invention claimed is:

1. A method of modelling uncertainty of sensors in a central-level tracking architecture system for fusing a plurality of sensor detections in respect to at least one sensor object, each of the at least one sensor object placed at a respective distance from each respective sensor, and the distance calculated on a main axis of each respective sensor, the method comprising:
   acquiring for each sensor the sensor detections of the at least one sensor object, each sensor detection corresponding to at least one dimension of the at least one sensor object, and each sensor detection including a respective sensor detection error;
   setting for each sensor a predetermined association gate minimum threshold for each dimension by setting for each sensor a predetermined amount of sensor detection error for each dimension;
   modeling for each sensor an increase of each sensor detection error using the predetermined amount of sensor detection error as a function of the distance;
   computing for each sensor an association gate for each sensor detection corresponding to each dimension by increasing according to the modeling the respective sensor detection error above the predetermined association gate minimum threshold;
   computing for each sensor a covariance matrix associated to each sensor detection by using scaling methods;
   storing a plurality of covariance matrices corresponding to all sensors; and
   providing the plurality of covariance matrices to the central-level tracking system for fusing the plurality of sensor detections of the current observation sequence to at least one fused object of an immediately previous observation sequence, each of the at least one fused object corresponding to each of the least one sensor object;
   wherein each covariance matrix represents the shape of the uncertainty of the corresponding sensor corresponding to each dimension.

2. The method of claim 1, wherein the method further comprises:
   generating graphically a matching ellipsoid for each covariance matrix, proportionally to the size of the respective covariance matrix and proportionally to the size of the association gate corresponding to each dimension.

3. The method of claim 2, wherein the at least one dimension comprises the position of the at least one sensor object.

4. The method of claim 3, wherein the at least one dimension comprises the velocity of the at least one sensor object.

5. The method of claim 4, wherein the at least one dimension comprises the acceleration of the at least one sensor object.

6. The method of claim 5, further comprising measuring the at least one dimension by acquiring sensor detections from sensors of the same type.

7. The method of claim 5, further comprising measuring the at least one dimension by acquiring sensor detections from sensors of different types.

8. The method of claim 7, wherein the acquiring comprises acquiring the sensor detections from at least one camera and from at least one radar.

\* \* \* \* \*